United States Patent [19]

Newton

[11] 3,801,800

[45] Apr. 2, 1974

[54] ISOLATING SWITCHING CIRCUIT FOR AN ELECTROSURGICAL GENERATOR

[75] Inventor: David W. Newton, Boulder, Colo.

[73] Assignee: Valleylab, Inc., Boulder, Colo.

[22] Filed: Dec. 26, 1972

[21] Appl. No.: 318,177

[52] U.S. Cl. ......... 307/117, 128/303.14, 128/303.17

[51] Int. Cl. ............................................ A61b 17/36

[58] Field of Search .................. 128/303.14, 303.17; 307/117, 116; 250/208, 209, 217 SS

[56] References Cited

UNITED STATES PATENTS

| | | | |
|---|---|---|---|
| 3,699,967 | 10/1972 | Anderson | 128/303.14 |
| 3,413,480 | 11/1968 | Biard et al. | 250/217 SS |

*Primary Examiner*—James R. Scott
*Assistant Examiner*—M. Ginsburg
*Attorney, Agent, or Firm*—Burton, Crandell & Polumbus

[57] ABSTRACT

An isolating switching circuit suitable for use in an electrosurgical generator to transmit mode information from an electrosurgical instrument to an electrosurgical power generator is disclosed. A selected light emitting diode is energized in accordance with the setting of a mode of operation switch located in the electrosurgical instrument. The light thus emitted impinges on an associated light activated transistor. The thusly activated light activated transistor in turn controls the mode of operation of the electrosurgical power generator so that the desired cutting or coagulating R.F. potential is generated. Alternatively no light emitting diode is energized and the electrosurgical generator idles.

6 Claims, 1 Drawing Figure

PATENTED APR 2 1974
3,801,800
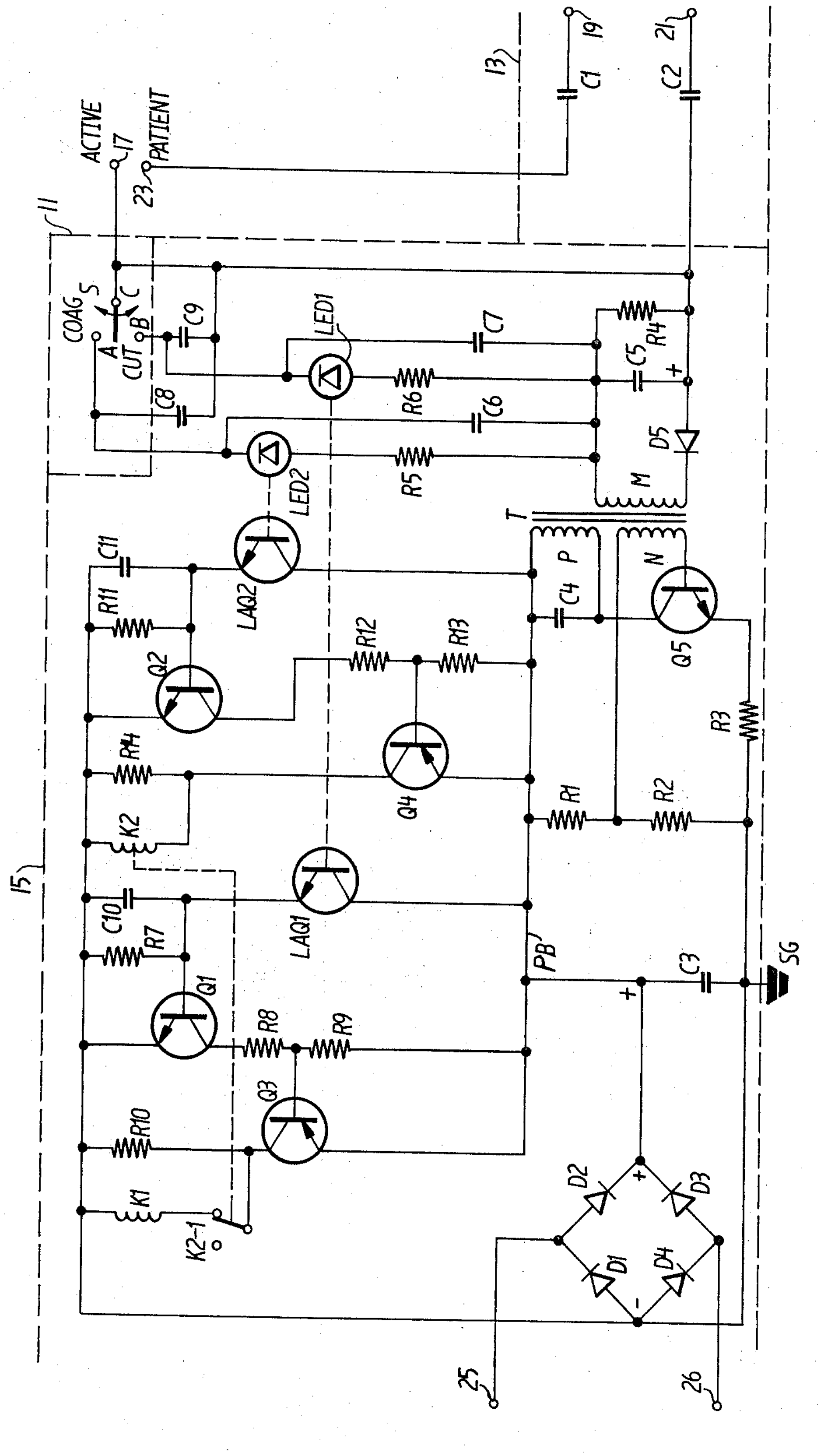

ISOLATING SWITCHING CIRCUIT FOR AN ELECTROSURGICAL GENERATOR

CROSS-REFERENCE TO RELATED APPLICATIONS

This application is related to U.S. Pat. No. 3,699,967, issued Oct. 24, 1972, and entitled "Electrosurgical Generator."

BACKGROUND OF THE INVENTION

This invention relates to electrosurgical generators and more particularly to an apparatus for isolating a control switch in an electrosurgical instrument from an electrosurgical power generator.

U.S. Pat. No. 3,699,967 referenced above describes an isolated output electrosurgical generator that utilizes a "floating" winding a transformer to provide safety against fault currents in the operating room. For such a device it is highly important that there be no stray electrical coupling from the output of the isolated system to any particular potential reference. Yet, as described in the foregoing patent, it is advantageous to provide an electrosurgical generator that provides a means at the electrosurgical instrument for switching the unit from one mode of operation to another mode of operation, i.e., from a cutting mode to a coagulation mode and vice versa. Such an apparatus allows the surgeon to operate in the most convenient manner possible. That is, he can control the mode of operation directly at the instrument, rather than by controlling the mode of operation via a remote switch, such as a foot switch, for example.

Obviously, the switch or other device at the electrosurgical instrument must be connected to the internal circuitry of the electrosurgical generator via wires running from the instrument to the generator. The wire coupling the R.F. potential output of the electrosurgical generator to the instrument is contained in the same bundle. Because these wires are adjacent to one another, the capacitance between the "active" output wire and the switching wires is always enough to produce excessive stray coupling currents at the R.F. potentials normally utilized. The above-identified patent attempts to compensate for this stray coupling problem by using a low capacitance decoupling circuit to transfer information pertaining to the mode of operation from the instrument to the generator. Such a decoupling circuit allows active electrosurgical instrument switching with negligible contribution to the patient terminal R.F. leakage current. More specifically, the above-indentified patent solves the stray coupling problem by passing a DC current through R.E. chokes as well as through the switch in the electrosurgical instrument and the control relays. The electromotive force causing the current to flow is provided by a conventional AC to DC converter. The R.F. chokes provide the desired degree of isolation by presenting a very high impedance at the radio frequency of the electrosurgical potential and a low impedance at the direct current used to operate the relays.

While the foregoing solution to the above noted capacitive coupling problem has been satisfactory, it is subject to improvement. That is, while the foregoing approach is satisfactory, it does not minimize coupling capacitance. The windings of the R.F. chokes always contain more distributed capacitance than that low value of capacitance which would render the minimum value of leakage currents limited by other factors.

Therefore, it is an object of this invention to provide a new and improved isolating switching circuit suitable for use in electrosurgical generators.

It is a further object of this invention to provide an isolating switching circuit having minimum capacitance.

It is a still further object of this invention to provide an isolating switching circuit having minimum capacitance.

It is a still further object of this invention to provide a highly reliable isolating switching circuit suitable for use in an electrosurgical generator.

SUMMARY OF THE INVENTION

In accordance with principles of this invention, an isolating switching circuit suitable for use in an electrosurgical generator to transmit mode information from an electrosurgical instrument to an electrosurgical power generator is disclosed. Light emitting devices are selectively energized in accordance with the setting of a control device located in the electrosurgical instrument. The light thus emitted impinges on associated light sensing devices. The thusly selected light sensing devices control the electrosurgical power generator so that the desired electrosurgical R.F. potential is generated.

In accordance with further principles of this invention, the electrosurgical generator can operate in a coagulation or a cutting mode. In addition the electrosurgical instrument includes a switch which can switch from a first position to a second position. When the switch is in the first position, light is emitted from a first light emitting device and sensed by a first light sensing device. When the switch is in the second position, light is emitted from a second light emitting device and sensed by a second light sensing device. In addition, if neither light emitting device is activated, the electrosurgical generator idles with no active output. The electrosurgical generator is controlled, in accordance with which of the light sensing devices detects emitted light, in a manner such that an R.F. potential suitable for cutting or coagulating is generated, as desired.

In accordance with further principles of this invention the light emitting devices are light emitting diodes and the light sensing devices are light activated transistors.

It will be appreciated from the foregoing brief summary that an isolating switching circuit suitable for use in an electrosurgical generator to transmit mode information from an electrosurgical instrument to an electrosurgical power generator is provided by the invention. Because the coupling means between the information generated at the electrosurgical instrument and the control circuit for the power generator is light, decreased capacitance over other types of coupling systems is provided by the invention. Moreover, since highly reliable devices which include both light emitting diodes and light activated transistors in a single structure are available, the invention has greater reliability than prior art circuits using other less reliable components. Preferrably, the DC current used to drive the light emitting diodes is provided by a standard DC to DC inverter which passes high frequency power through a low capacitance transformer in order to isolate the DC current from the R.F. potential generated by the electrosurgical generator power supply.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawing wherein a schematic diagram of a preferred embodiment of an isolating switching circuit formed in accordance with the invention is illustrated.

DESCRIPTION OF THE PREFERRED EMBODIMENT

While the invention can be used with a variety of electrosurgical generators suitable for use in electrosurgery for cutting and coagulation, in order for it to be better understood, it is described in conjunction with the electrosurgical generator described in U.S. Pat. Ser. No. 3,699,967 referenced above. That is, this invention can replace the circuit illustrated in FIG. 5 of U.S. Pat. application No. 3,699,967 and, thus, is described in conjunction with that patent so that it will be more easily understood.

The single FIGURE illustrates a preferred embodiment of the invention and comprises: an electrosurgical instrument 11; an output circuit 13; and an isolating switching circuit 15. The electrosurgical instrument houses a single pole double throw switch designated S which includes a common terminal designated C, coagulation terminal designated A and a cut terminal designated B. The common terminal C is connected to an active electrode 17 which as will be understood by those skilled in the art is used by a surgeon to perform electrosurgical operations. The A and B terminals are connected to the isolating switching circuit 15 as hereinafter described and can be selectively connected to the common terminal C by moving a conventional switch element. The conventional switch element has a center or rest position at which the common terminal C is not connected to either terminal A or terminal B.

The output circuit 13 comprises a pair of R.F. input terminals 19 and 21 connected to the output of an electrosurgical generator, such as the secondary winding of transformer T2 described in U.S. Pat. No. 3,699,967 for example. The first R.F. input terminal 19 is connected through a first isolating capacitor designated C1 to a patient terminal 23. The patient terminal 23 is connected to the patient plate of a conventional electrosurgical apparatus in a manner well understood in the art. The second R.F. input terminal 21 is connected to one side of a second isolating capacitor desiganted C2.

The isolating switching circuit 15 which is the primary subject matter of this invention comprises: first and second light emitting diodes designated LED1 and LED2; to light activated transistors designated LAQ1 and LAQ2; two NPN control transistors designated Q1 and Q2; two PNP power transistors designated Q3 and Q4; a NPN switching transistor designated Q5; a diode bridge comprising four diodes designated D1, D2, D3 and D4; a single rectifying diode designated D5; nine capacitor designated C3 through C11; fourteen resistors designated R1 through R14; a transformer designated T having a primary winding designated P, a secondary winding designated M and a switching winding designated N; and, two relay coils designated K1 and K2.

Electrical energy is supplied to the isolating switching circuit from a suitable power supply, such as the power supply illustrated in FIG. 2 of U.S. Pat. No. 3,699,967 via a pair of input terminals 25 and 26. The input terminals are connected to the diode bridge formed of diodes D1, D2, D3 and D4. More specifically, the first input terminal 25 is connected to the cathode of D1 and the anode of D2. The anode of D1 is connected to the anode of D4 and the cathode of D2 is connected to the cathode of D3. The second input terminal 26 is connected to the cathode of D4 and the anode of D3. The junction between D1 and D4 is at signal ground (SG) and is so connected as illustrated in the FIGURE. The junction betwen D2 and D3 is connected to a positive power bus designated PB and through C3 to signal ground (SG).

R1 and R2 are connected in parallel between the power bus (PB) and signal ground (SG). The junction between R1 and R2 is connected to one side of winding N of transformer T. The other side of N is connected to the base of Q5. The emitter of Q5 is connected through R3 to SG and the collector of Q5 is connected through C4 to B. The primary winding P of T is connected in parallel with C4.

The secondary winding M of T has one end connected to the cathode of D5. The anode of D5 is connected through C5 to the other side of M. R4 is connected in parallel with C5.

It will be appreciated at this point that the diode bridge formed of D1, D2, D3 and D4 rectifies the AC voltage applied to the circuit. The rectified voltage is smoothed by capacitor C3 and applied via R1 and R2 to the feedback oscillator formed of Q5, R3, N, P and C4. The high frequency oscillating voltage formed across the secondary winding M is rectified by D5. The rectified voltage is smoothed by C5. Thus, the voltage across C5 is a DC voltage. This voltage is used, as hereinafter described to provide power for the light emitting diodes. It should be noted that the transformer of the feedback oscillator isolates this DC voltage from the AC voltage applied to the circuit at terminals 25 and 26.

The junction between M and C5 is connected through R5 to the anode of LED2. The cathode of LED2 is connected to terminal A of S. In addition, C6 is connected in parallel with the series combination of R5 and LED2. Terminal A of S is also connected through C8 to the anode of D5. The junction between M and C5 is also connected through R6 to the anode of LED1. The cathode of LED1 is connected to terminal B of S. C7 is connected in parallel with the series combination of R6 and LED1. In addition, terminal B of S is connected through C9 to the anode of D5.

It will be appreciated from viewing the FIGURE that when the movable element of S is in its upper position (connecting terminal A to terminal C), LED2 has a current passing through it. This current flow causes LED2 to emit infra-red light. Since LED1 is not passing current when S is in this position, it does not emit light. Conversely, when the movable element of S is in its lower position (connecting terminal B to terminal C), LED1 is energized, but not LED2. Thus, by selectively controlling the position of the movable element of S, selective control of the emission of light by LED1 and LED2 is provided. Further, when the movable element of S is in its rest position neither LED1 or LED2 is energized.

The base of LAQ1 is light coupled to LED1 as illustrated by the dashed line in the FIGURE. Similarly, the base of LAQ2 is light coupled to LED2 as illustrated by the dashed line in the FIGURE. Thus, when LED1 emits light, LAQ1 is activated and when LED2 emits light LAQ2 is activated.

The collector of LAQ1 is connected to the power bus (PB) and the emitter of LAQ1 is connected through C10 to signal ground (SG). R7 is connected in parallel with C10. The junction between the emitter of LAQ1 and C10 is connected to the base of Q1. The emitter of Q1 is connected to SG and the collector of Q1 is connected through R8 in series with R9 to PB. The junction between R8 and R9 is connected to the base of Q3. The emitter of Q3 is connected to B and the collector of Q3 is connected through R10 to SG. The junction between Q3 and R10 is connected to the terminal of the movable element of a set of relay contacts designated K2-1 and operated by relay coil K2 in the manner hereinafter described. One terminal of K2-1 is unconnected the other terminal is connected through K1 to SG.

The collector of LAQ2 is connected to PB and the emitter of LAQ2 is connected through C11 to SG. R11 is connected in parallel with C11. The junction between the emitter of LAQ2 and C11 is connected to the base of Q2. The emitter of Q2 is connected to SG and the collector of Q2 is connected through R12 in series with R13 to PB. The junction between R12 and R13 is connected to the base of Q4. The emiitter of Q4 is connected to PB and the collector of Q4 is connected through R14 to SG. Relay coil K2 is connected in parallel with R14.

Relay coils K1 and K2 control the operation of an electrosurgical power generator so that it generates either a cutting or a coagulating electrosurgical R.F. potential. Reference is hereby made to the above noted U.S. Pat. No. 3,699,967 for a description of how the relay coils control the operation of one type of an electrosurgical power generator. In addition, relay coil K2 operates relay contacts K2-1. More specifically, normally the movable contact of K2-1 is in a position such that K1 is connected in parallel with R10. However, when K2 is energized in the manner hereinafter described, these relay contracts change position so that K1 is disconnected from the collector of Q3 and its parallel relationship with R10. This action assures that K1 cannot be energized when K2 is energized.

Turning now to a more complete description of the operation of the invention, as previously described, a DC-to-DC converter provides power in an isolated manner to the light emitting diodes LED1 and LED2. Assuming LED1 is energized, i.e. switch S is positioned such that contact B is connected to contact C, LAQ1 is also activated. Activating of LAQ1 allows a current to be applied to the base of control transistor Q1. When Q1 is thus turned on, a voltage is applied to the base of Q3 which in turn applies power to R10 and K1 (K2-1 being in the position illustrated in the FIGURE because K2 is not energized due to LED2 not being energized). When K1 is activated, it causes relay contacts to operate in a manner such that power from the electrosurgical power generator (not shown) is applied to terminal 21 and thus to the active electrode 17. The power is such that a surgeon can perform a cutting operation. Reference is made to U.S. Pat. No. 3,699,967 for a description of the closure of suitable relay contacts and the generation of the desired R.F. potential.

Turning now to the other mode of operation wherein terminal A is connected to terminal C. In this mode of operation LED2 is energized, but not LED1. When LED2 is energized LAQ2 becomes activated. Activation of LAQ2 turns control transistor Q2 "on." When Q2 is turned "on" a voltage is applied to Q4, and Q4 in turn powers relay coil K2. K2 controls the electrosurgical power supply in a manner such that a coagulation R.F. potential is applied to terminal 21 and thus active electrode 17. In addition, because K2 is energized K2-1 changes position from the position illustrated in the FIGURE to insure that K1 cannot become activated.

Thus, the invention provides a control system wherein optical coupling is used to couple information from the electrosurgical instrument to the power generator. More specifically, the invention provides an electrosurgical instrument that includes a switch which selectively controls the activation of light emitting devices. Which of the light emitting devices is activated determines which of a plurality of light sensing devices is energized. The light sensing devices in turn determine which relay coil of plural relay coils is energized. In turn, the energized relay coil controls the form of the R.F. potential generated by the electrosurgical power generator and applied to the active electrode. Further, if the switch is placed in its rest position the electrosurgical power generator idles.

Because optical coupling and an isolated power supply for the light emitting diodes is provided, the isolating switching circuit illustrated in the FIGURE and previously described, overcomes prior art problems related to high capacitive coupling. In addition, because light emitting diodes and light activated transistors are utilized, the circuit is highly reliable.

While a preferred embodiment of the invention has been illustrated and described, it will be appreciated by those skilled in the art and others that various changes can be made therein without departing from the spirit and scope of the invention. For example, other types of power circuits can be utilized with the LED-LAQ coupling circuit described. Moreover, other types of light coupling systems can be utilized. Hence, the invention can be practiced otherwise than as specifically described herein.

The embodiments of the invention in which an exclusive property or privilege is claimed are defined as follows:

1. In an electrosurgical apparatus having an electrosurgical power generator and an electrosurgical instrument, an isolating switching circuit to transmit mode information from said electrosurgical instrument to said electrosurgical power generator, said isolating switching circuit comprising:

a control device mounted in said electrosurgical instrument;

light emitting means for selectively emitting at least one light beam, said light emitting means connected to said control device so as to be activated by said control device;

light sensing means for sensing said at least one light beam generated by said light emitting means and for generating a control voltage in accordance therewith; and, control means connected to said light sensing means for controlling the operation of said electrosurgical power generator in a manner determined by the light sensed by said light sensing means.

2. An isolating switching circuit as claimed in claim 1 wherein said control device comprises a switch located in said electrosurgical instrument, and wherein said light emitting means comprises first and second light emitting diodes selectively energized in accordance with the operation of said control device.

3. An isolating switching circuit as claimed in claim 2 wherein said light sensing means includes first and second light activated transistors selectively energized by said light emitting diodes.

4. An isolating switching circuit as claimed in claim 3 wherein said light emitting means also includes a DC-to-DC converter connected so as to energize said light emitting diodes in accordance with the operation of said control device.

5. An isolating switching circuit as claimed in claim 4 wherein said switch is a single pole double throw switch connected so that one of said light emitting diodes is energized when said switch is in one position and the other of said light emitting diodes is energized when said switch is in the other position.

6. An isolating switching circuit as claimed in claim 5 wherein said control means comprises first and second relays selectively operated by said light activated transistors.

* * * * *

UNITED STATES PATENT OFFICE

CERTIFICATE OF CORRECTION t No. 3,801,800 Dated December 26, 1972 itor(s) David W. Newton

It is certified that error appears in the above-identified patent that said Letters Patent are hereby corrected as shown below:

lumn 1, line 53 "R.E." should read --R.F.--.

lumn 3 line 20 delete "Ser.".
line 23 delete "application".

lumn 5, line 17 "B" should read --PB--.

Signed and Sealed this

Twenty-seventh Day of July 1976

EAL]

Attest:

RUTH C. MASON
*Attesting Officer*

C. MARSHALL DANN
*Commissioner of Patents and Trademarks*